(12) United States Patent
Hori et al.

(10) Patent No.: US 6,837,209 B2
(45) Date of Patent: Jan. 4, 2005

(54) INTERNAL COMBUSTION ENGINE WITH TORQUE CONVERTER

(75) Inventors: Yoshiaki Hori, Saitama (JP); Tohru Nishi, Saitama (JP); Seiji Hamaoka, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 7 days.

(21) Appl. No.: 10/301,718

(22) Filed: Nov. 22, 2002

(65) Prior Publication Data

US 2003/0136447 A1 Jul. 24, 2003

(30) Foreign Application Priority Data

Nov. 30, 2001 (JP) .......................................... 2001-365942

(51) Int. Cl.⁷ .......................... B60K 17/02; F16H 41/04; F16H 57/00
(52) U.S. Cl. ................ 123/196 R; 123/196 A
(58) Field of Search .......................... 123/196 R, 196 A (56) References Cited

U.S. PATENT DOCUMENTS

| | | | | |
|---|---|---|---|---|
| 4,344,561 A | * | 8/1982 | Iizuka et al. ............ | 123/196 R |
| 4,433,655 A | * | 2/1984 | Villella ................... | 123/196 R |
| 4,793,301 A | * | 12/1988 | Ishikawa ................ | 123/196 R |
| 5,199,395 A | * | 4/1993 | Mizumura et al. ...... | 123/196 A |
| 5,495,833 A | * | 3/1996 | Ishizaka et al. ......... | 123/196 R |
| 5,597,051 A | * | 1/1997 | Moriya et al. .......... | 123/196 R |
| 6,357,413 B1 | * | 3/2002 | Ito et al. ................. | 123/196 R |
| 6,443,263 B1 | * | 9/2002 | Ito et al. ................. | 123/196 R |

FOREIGN PATENT DOCUMENTS

JP 56-97650 U 8/1981

\* cited by examiner

*Primary Examiner*—Henry C. Yuen
*Assistant Examiner*—Jason Benton
(74) *Attorney, Agent, or Firm*—Birch, Stewart, Kolasch & Birch, LLP (57) ABSTRACT

To enhance productivity and maintainability of an internal combustion engine for a vehicle with a torque converter. An internal combustion engine with a torque converter includes a single feed pump for supplying both a working oil for a torque converter and a lubricating oil for the engine with an oil filter in communication with a discharge port of the feed pump being fitted to a crankcase cover. An outlet oil passage of the oil filter is branched into a low-pressure oil passage provided with an orifice and an oil passage for supplying a high-pressure control oil to changeover valves of a transmission. The high-pressure oil passage is provided concentratedly in the crankcase cover.

20 Claims, 9 Drawing Sheets

INTERNAL COMBUSTION ENGINE WITH TORQUE CONVERTER

CROSS-REFERENCE TO RELATED APPLICATIONS

The present application claims priority under 35 USC 119 to Japanese Patent Application No. 2001-365942 filed on Nov. 30, 2001 the entire contents thereof is hereby incorporated by reference.

BACKGROUND OF THE INVENTION

1. Field of the Invention

The present invention relates to an improvement in an internal combustion engine for a vehicle that is provided with a torque converter.

2. Description of Background Art

An internal combustion engine with torque converter according to the prior art is disclosed in Japanese Utility Model Laid-open No. Sho 56-97650. This torque converter has a structure in which a suction port and a discharge port of an oil pump that are driven by an engine are connected respectively to an oil strainer at a bottom portion of a crankcase and to a working oil inlet of a torque converter connected to the engine. A working oil outlet of the torque converter is opened in the vicinity of the suction port of the oil pump or an inlet of the oil strainer. Further, a fence having a communication hole at a bottom portion thereof is provided surrounding the oil strainer. Oil supplied from the oil strainer by the oil pump is branched into a lubricating oil for the engine and a working oil for the torque converter. The oil having passed through the torque converter returns to an oil pan through a check valve and an oil cooler. Though the oil for operating the torque converter is used in common as the lubricating oil for the engine, the oil lines are independent from each other.

In the above-mentioned internal combustion engine with a torque converter according to the prior art, the oil strainer is provided on the suction side of the pump. However, the oil strainer is of the non-replacement type. Thus, it is necessary to secure the oil strainer size taking its life expectancy into account, so that a large fitting space is required. In addition, since lubrication of the torque converter is set singly, the lubrication cannot be used in common for lubrication of a crankshaft, and a setting shaft of the torque converter is restricted.

SUMMARY AND OBJECTS OF THE INVENTION

In order to solve the above problems in the prior art, the present invention resides in an internal combustion engine with a torque converter including a single feed pump for supplying a working oil for a torque converter and a lubricating oil for the engine wherein an oil filter that is in communication with a discharge port of the feed pump is fitted to a crankcase cover. An outlet oil passage of the oil filter is provided that is branched into a low-pressure oil passage provided with an orifice and an oil passage for supplying a control high-pressure oil to changeover valves of a transmission, and the high-pressure oil passage is provided concentratedly in the crankcase cover.

According to the present invention constituted as above, the oil filter is in communication with the discharge port of the feed pump and is fitted to the crankcase cover with the outlet oil passage of the oil filter being branched into the low-pressure oil passage provided with the orifice and the oil passage for supplying the control high-pressure oil to changeover valves of the transmission. The high-pressure oil passage is provided concentratedly in the crankcase cover. Therefore, replacement and repair of the oil filter and the high-pressure oil passage can be performed while they are in the condition of being mounted on the vehicle, by only detaching the crankcase cover. In addition, connection parts of the crankcase cover inclusive of the oil filter can be preliminarily assembled, so that the number of operating steps in a main line can be reduced, whereby productivity is enhanced. In addition, a leakage test of the high-pressure portion and the like can be performed before assembling the crankcase cover, so that operability is improved.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
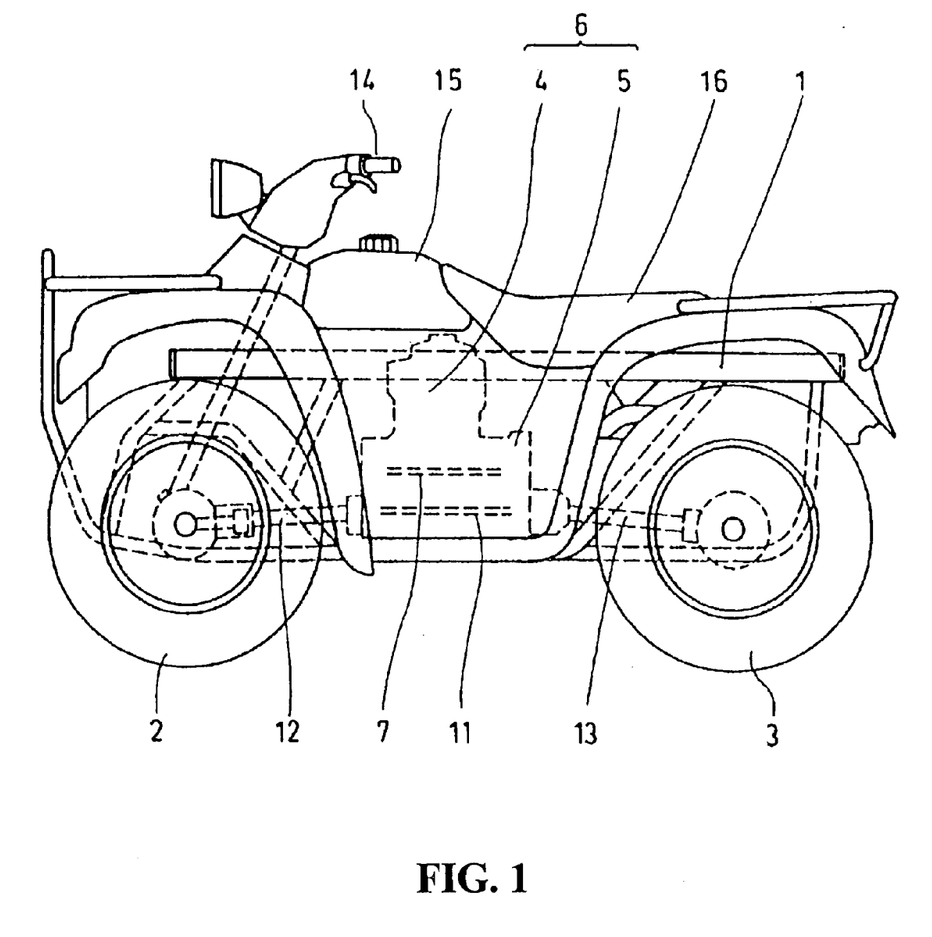
FIG. 1 is a side view of a four-wheel buggy car (saddle ride type vehicle for operating on wasteland) on which an internal combustion engine according to the present invention is mounted.

FIG. 1 is a side view of a four-wheel buggy car (saddle ride type vehicle for operating on wasteland) on which an internal combustion engine with a torque converter according to the present invention is mounted. The buggy car has a structure in which left-right pairs of front wheels 2 and rear wheels 3 are provided respectively at front and rear portions of a vehicle body frame 1, and a power unit 6 integrally including an internal combustion engine 4 and a transmission 5 is supported on a central portion of the vehicle body frame 1. The power unit 6 is disposed with a crankshaft 7 directed in the front-rear direction of the vehicle body.

The rotation of the crankshaft 7 is transmitted through a main shaft 8, a counter shaft 9, and an intermediate shaft 10 (all shown in FIG. 4) of the transmission to an output shaft 11. These shafts are all parallel to the crankshaft, and are disposed in the front-rear direction of the vehicle body. The front wheels 2 are driven by a front wheel drive shaft 12 connected to the front end of the output shaft 11, while the rear wheels 3 are driven by a rear wheel drive shaft 13 connected to the rear end of the output shaft 11. A steering handle 14, a fuel tank 15, and a saddle type seat 16 are provided, in this order from the front side, at upper portions of the vehicle body.

Figure 2:
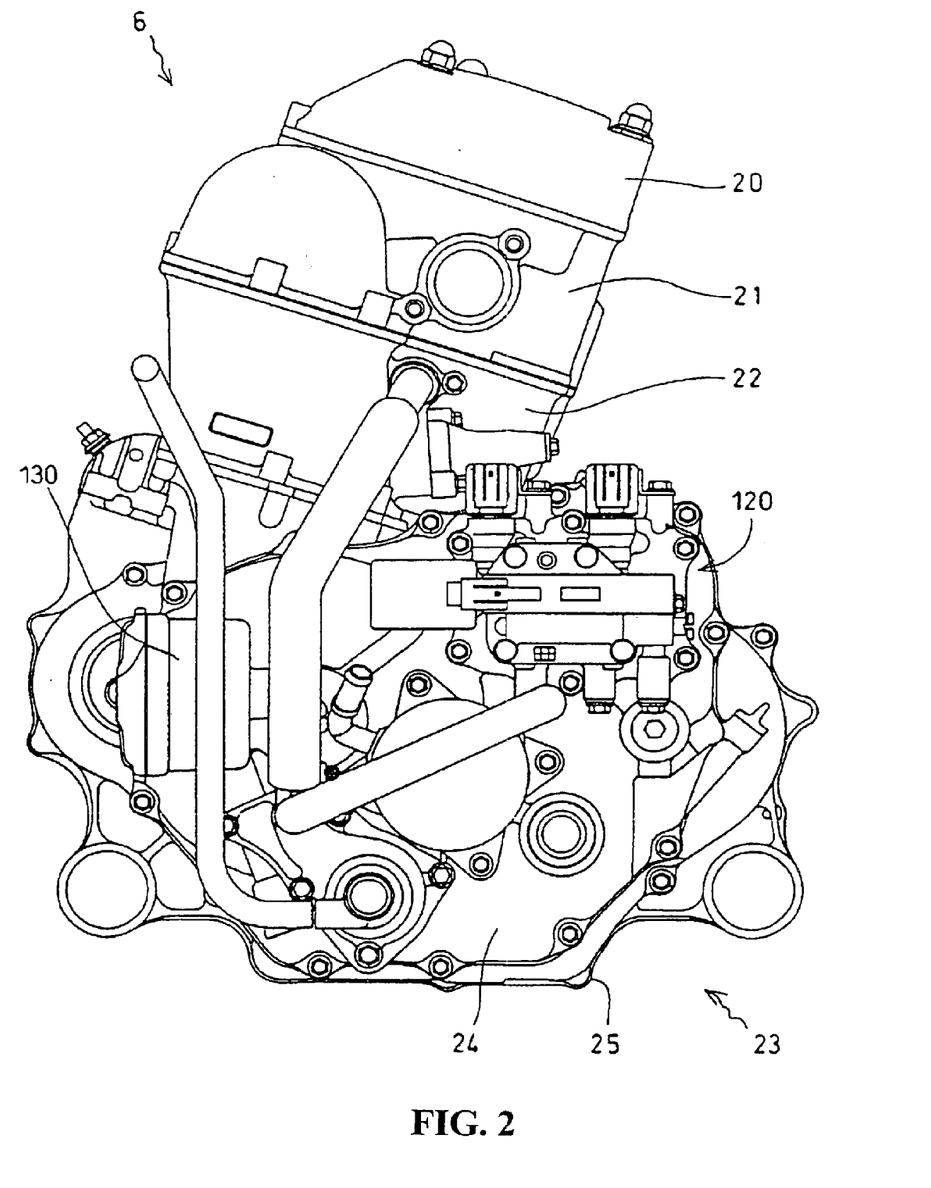
FIG. 2 is a front view of a power unit according to the present invention.

FIG. 2 is a front view of the power unit 6 according to the present invention, in which the front surface of the power unit 6 is viewed from the front side. A main body portion of the power unit 6 is generally composed of four portions, namely, a cylinder head cover 20, a cylinder head 21, a cylinder block 22, and a crankcase 23, in this order from the upper side.

In addition, the crankcase 23 is divided in a plane orthogonal to the crankshaft 7 into four portions which include a front crankcase cover 24, a front crankcase 25, a rear crankcase 26 and a rear crankcase cover 27 (these are partially shown in FIGS. 5 and 6), in this order from the front side. In FIG. 2, the front crankcase cover 24 is seen, and the front crankcase 25 is a little seen in the surroundings thereof. Various equipment and pipings are fitted to a front surface of the front crankcase cover 24.

Figure 3:
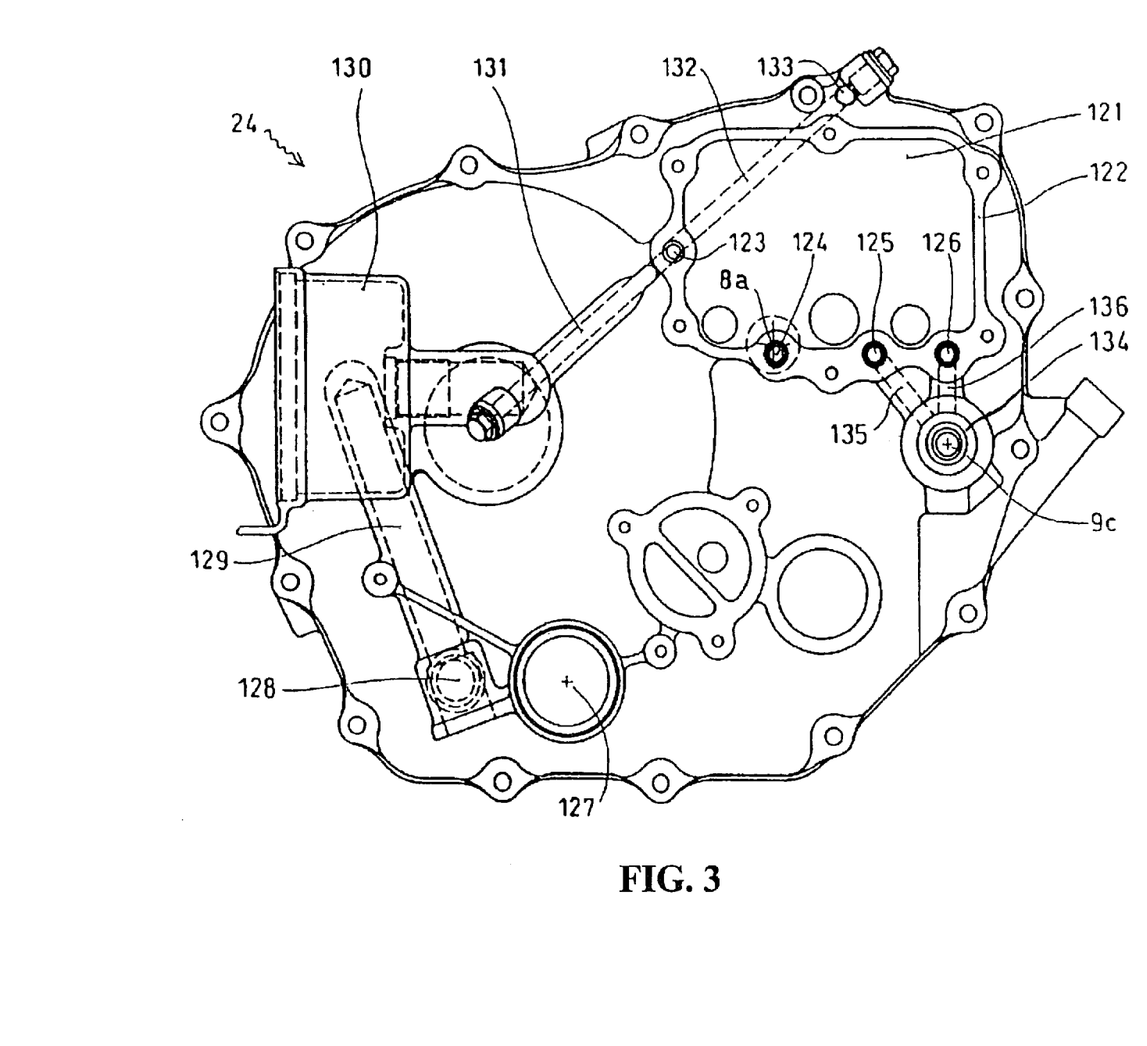
FIG. 3 is a view of a front crankcase cover from the front side.
Figure 4:
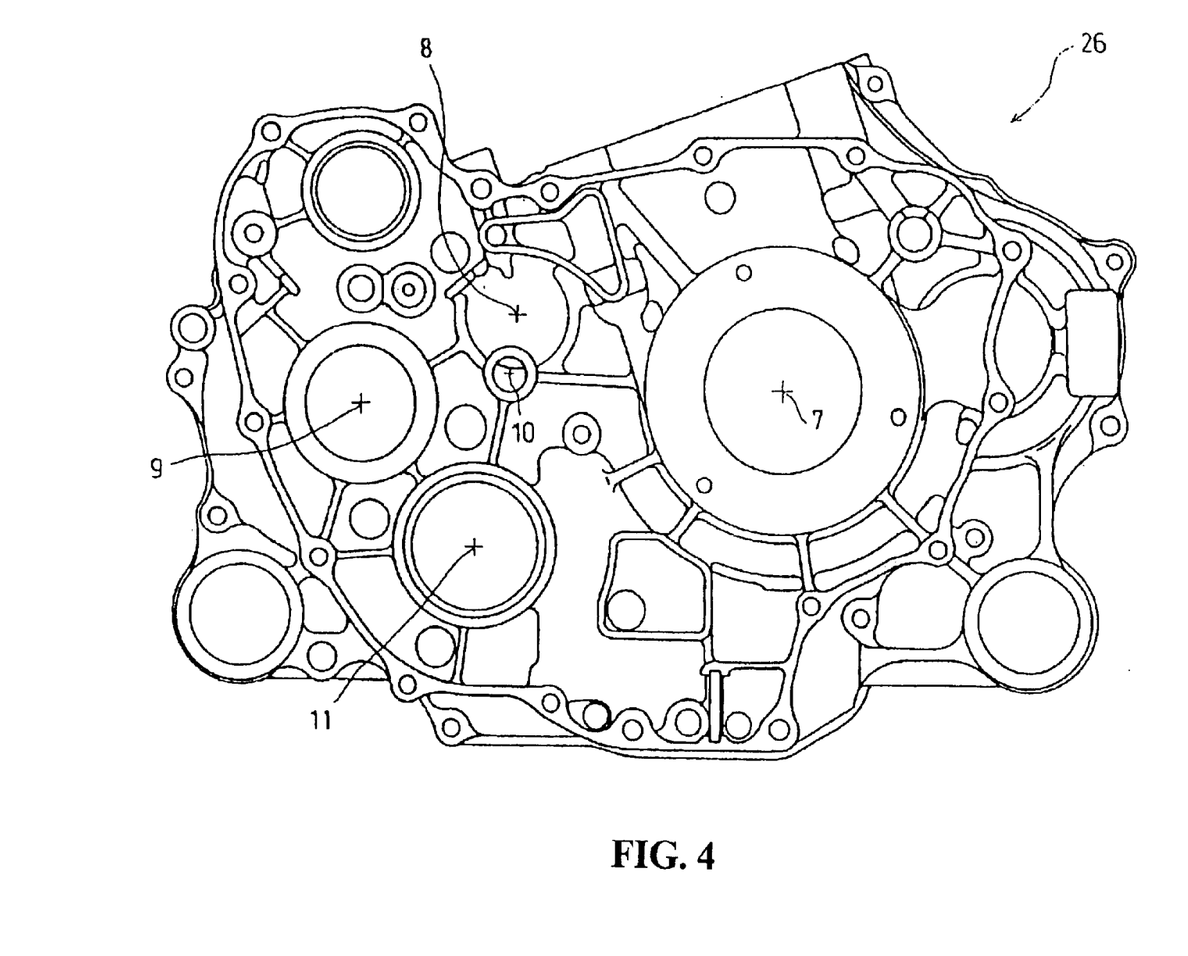
FIG. 4 is a view of a rear crankcase from the rear side.

FIG. 3 is a view of only the front crankcase cover 24 from the front side, and FIG. 4 is a view of the rear crankcase 26 from the rear side. FIG. 4 shows the positions of the crankshaft 7 and the main shaft 8, the counter shaft 9, the intermediate shaft 10 and the output shaft 11 of the transmission.

Figure 5:
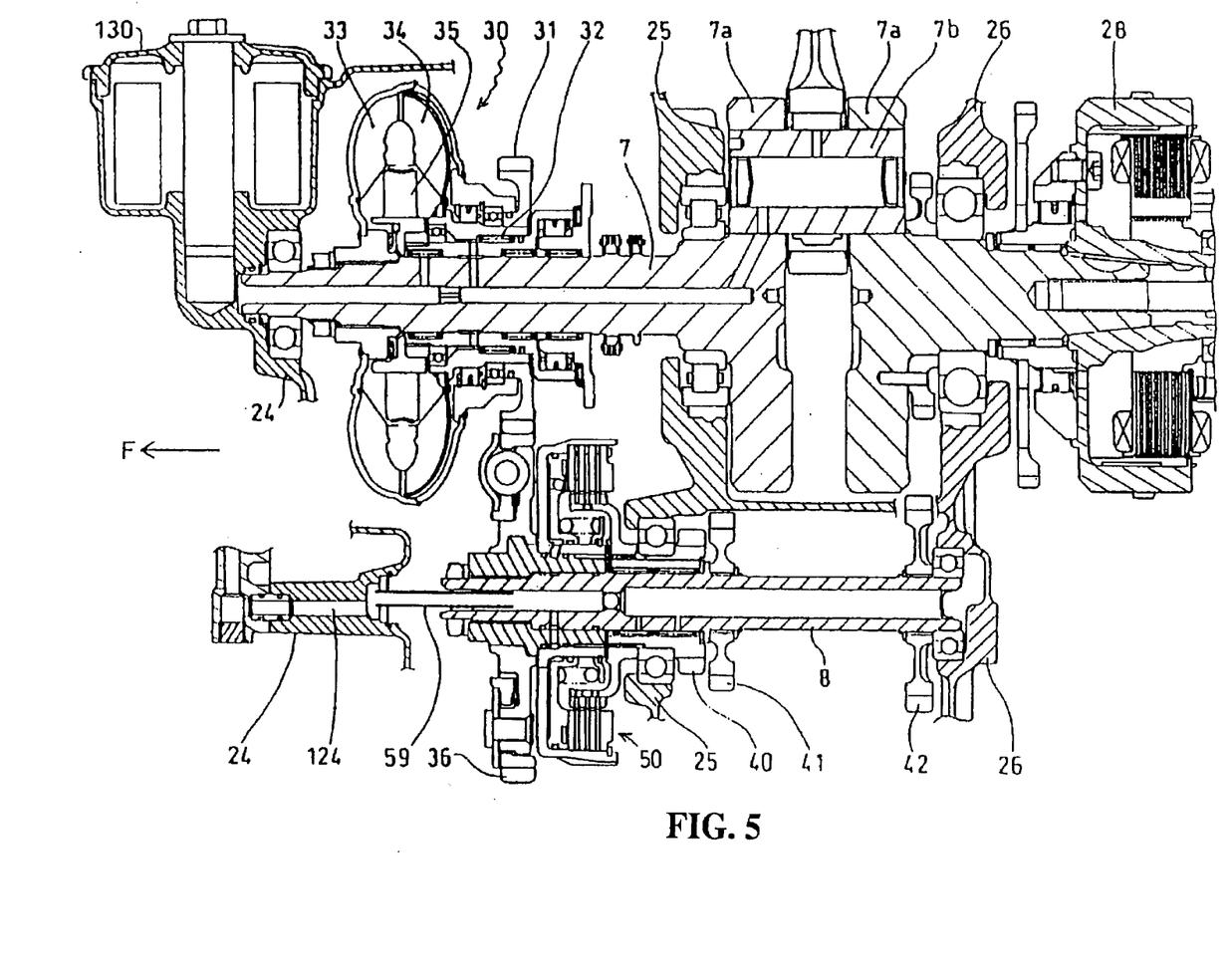
FIG. 5 is a vertical sectional view of the inside of a crankcase, showing the relationship between a crankshaft and a main shaft.
Figure 6:
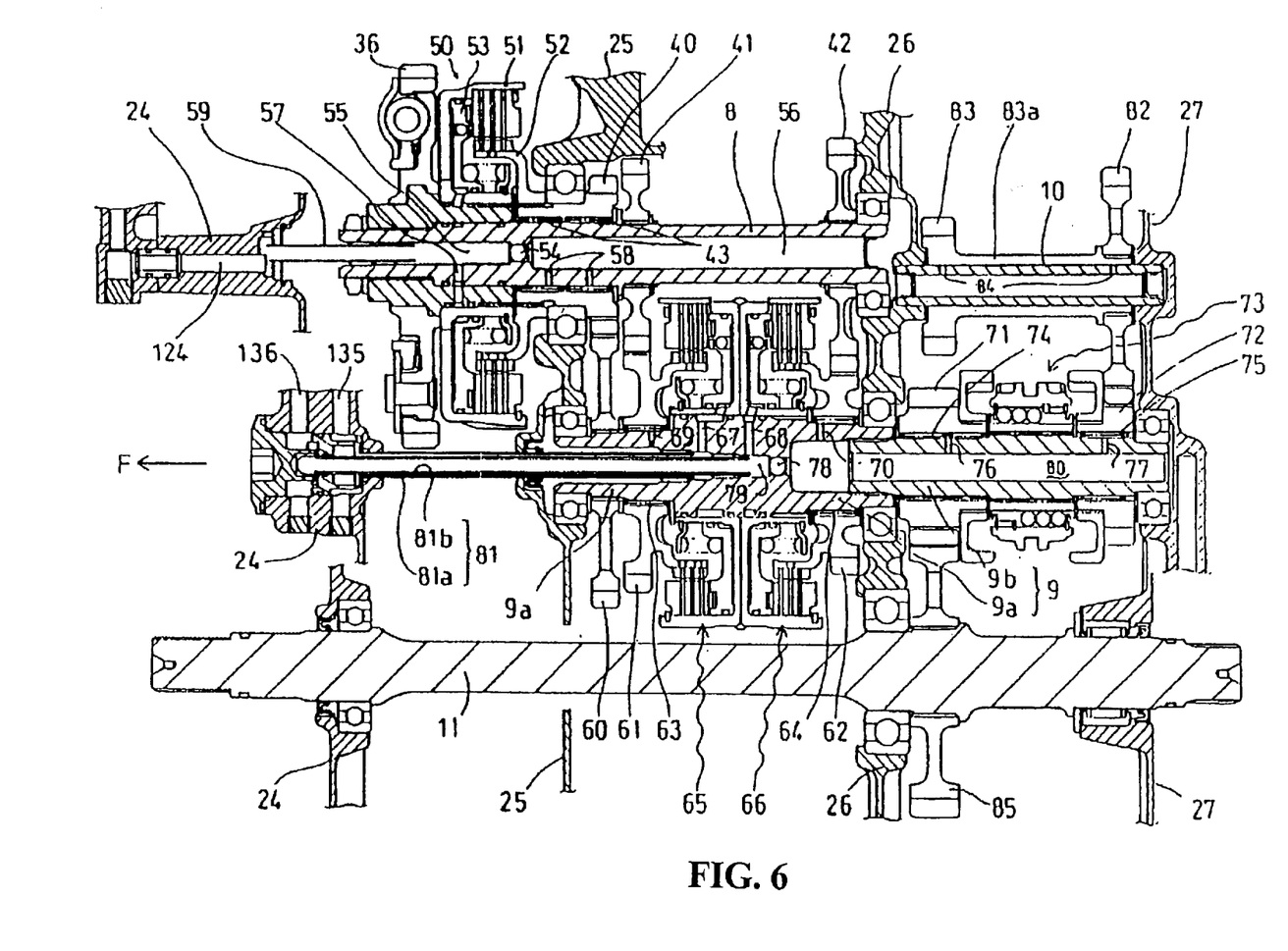
FIG. 6 is a vertical sectional view of the inside of the crankcase, showing the relationship among the main shaft, a counter shaft, an intermediate shaft, and an output shaft.

FIGS. 5 and 6 are vertical sectional views of the inside of the crankcase passing through main shafts in the crankcase, in which FIG. 5 shows the relationship between the crankshaft 7 and the main shaft 8, and FIG. 6 shows the relationship among the main shaft 8, the counter shaft 9, the intermediate shaft 10, and the output shaft 11. In FIGS. 5 and 6, arrow F indicates the front or forward direction.

FIG. 5 shows a power transmission mechanism between the crankshaft 7 and the main shaft 8. The crankshaft 7 is supported on the front and rear crankcases 25 and 26 through bearings. A front extended portion of the crankshaft 7 is supported on the front crankcase cover 24 through a bearing. The crankshaft 7 is divided into front and rear portions, which are connected by a crank pin 7b at a crank web 7a. An AC generator 28 for generating power by rotation of the crankshaft 7 is fitted to the rear end of the crankshaft 7.

The crankshaft 7 is provided with a primary driving gear 31 through a torque converter 30. The primary driving gear 31 is rotatably supported on the crankshaft 7 through a needle bearing 32. On the other hand, the torque converter 30 includes a pump impeller 33 fixed to the crankshaft 7, a turbine runner 34 opposed thereto, and a stator 35. The primary driving gear 31, rotatable in relation to the crankshaft 7, is connected to the turbine runner 34, and power from the crankshaft 7 is transmitted to the primary driving gear 31 through the working oil. A primary driven gear 36 constantly meshed with the primary driving gear 31 is fixed to a front end portion of the main shaft 8 of the transmission. The rotation of the crankshaft 7 is transmitted to the main shaft 8 through the torque converter 30 and further through primary speed reduction performed by the primary driving gear 31 and the primary driven gear 36.

FIG. 6 shows a power transmission mechanism among the main shaft 8, the counter shaft 9, the intermediate shaft 10, and the output shaft 11 of the transmission. The main shaft 8 of the transmission is supported on the front and rear crankcases 25 and 26 through bearings. The main shaft 8 is provided with a first gear position driving gear 40, a second gear position driving gear 41, and a third gear position driving gear 42, which differ in the number of teeth according to speed reduction ratios. The second gear position driving gear 41 and the third gear position driving gear 42 are fixed gears, which are fixed on the main shaft 8, while the first gear position driving gear 40 is rotatably supported on the main shaft 8 through a needle bearing 43. In the description below, generally, a gear rotatably supported on a rotary shaft through a needle bearing is called a floating gear.

A first gear position oil hydraulic type multiple disk clutch 44 is intermediately provided between the main shaft 8 and the first gear position driving gear 40. The clutch has a clutch outer 51 fixed to the main shaft 8, and a clutch inner 52 connected to the first gear position driving gear 40. A pressure plate 53, movable in the axial direction, is fitted to the clutch outer 51. The main shaft 8 is provided with a center hole steppedly varied in inside diameter on the centerline thereof. A steel ball 54 is pressed into a narrowest portion of the center hole to partition the center hole into a front portion center hole 55 and a rear portion center hole 56. The main shaft 8 is provided with a working oil supply hole 57 for communicating the front center hole 55 with the first gear position oil hydraulic type multiple disk clutch 50, and a lubricating oil supply hole 58 for communicating the rear portion center hole 56 with the needle bearing 43.

The working oil for the first gear position oil hydraulic type multiple disk clutch 50 is fed from the side of the front crankcase cover 24 to the front portion center hole 55 through a working oil supply pipe 59, and is supplied to the clutch 50 through the working oil supply hole 57. The working oil comes to a position between the clutch outer 51 and the pressure plate 53. With the pressure plate 53 moved by the oil pressure, the clutch is set into a connected condition, whereby the first gear position driving gear 40 is fixed to the main shaft 8, and the rotation of the main shaft 8 is transmitted to the first gear position driving gear 40.

The counter shaft 9 includes a front portion counter shaft 9a and a rear portion counter shaft 9b which are integrated with each other to form the counter shaft 9. The counter shaft 9 is supported on the front crankcase 25, the rear crankcase 26, and the rear crankcase cover 27 through bearings. The front portion counter shaft 9a is provided with a first gear position driven gear 60, a second gear position driven gear 61, and a third gear position driven gear 62, which are constantly meshed, respectively, with the first gear position driving gear 40, the second gear position driving gear 41, and the third gear position driving gear 42 on the main shaft 8.

The first gear position driven gear 60 is a fixed gear fixed to a shaft, while the second gear position driven gear 61 and the third gear position driven gear 62 are floating gears, which are supported rotatably in relationship to the counter shaft 9 through needle bearings 63 and 64, respectively. A second gear position oil hydraulic type multiple disk clutch 65 and a third gear position oil hydraulic type multiple disk clutch 66 are intermediately provided between the counter shaft 9 and these floating gears, respectively. In these clutches, a clutch outer is fixed to the counter shaft 9 and a clutch inner is connected to the floating gear. The constitution and actions of these clutches are the same as those of the above-mentioned first gear position oil hydraulic type multiple disk clutch 50. Working oil is supplied through working oil supply holes 67 and 68 formed in the counter shaft, whereby floating of the floating gears is stopped, to enable transmission of power, thereby performing speed reduction at the second gear position or the third gear position. Lubricating oil supply holes 69 and 70 leading to the needle bearings 63 and 64 for bearing the second gear position driven gear 61 and the third gear position driven gear 62 are also formed in the counter shaft 9.

The counter shaft 9 includes the front portion counter shaft 9a and the rear portion counter shaft 9b integrated with each other and provided with a center hole, which is partitioned into a front portion center hole 79 and a rear portion center hole 80 by a steel ball 78 press fitted in a narrowest portion thereof. The supply of working oil to the second and third gear position oil hydraulic type multiple disk clutches 65 and 66 is conducted from the side of the front crankcase cover 24 through a double-wall pipe 81. The double-wall pipe 81 includes an outer pipe 81a and an inner pipe 81b. The working oil for the second gear position oil hydraulic type multiple disk clutch 65 is supplied through an oil passage between the outer pipe 81a and the inner pipe 81b and through the working oil supply hole 67. The working oil for the third gear position oil hydraulic type multiple disk clutch 66 is supplied through an oil passage inside the inner pipe 81b and the working oil supply hole 68.

The rear portion counter shaft 9b is provided with a forward-operating driving gear 71 and a backward-operating driving gear 72. These are both floating gears, of which the one engaged with a manual dog clutch 73 provided at an intermediate position therebetween is fixed to a shaft, whereby transmission of power is enabled. Lubricating oil supply holes 76 and 77 for supplying a lubricating oil to needle bearings 74 and 75, respectively, bearing the forward-operating driving gear 71 and the backward-operating driving gear 72 are formed in the rear portion counter shaft 9b.

The intermediate shaft 10 is supported on the rear crankcase 26 and the rear crankcase cover 27. A first intermediate gear 82 constantly meshed with the backward-operating driving gear 72 and a second intermediate gear 83 and connected to the first intermediate gear 82 through a long sleeve portion 83a are rotatably held on the intermediate shaft 10.

The output shaft 11 is supported on the front crankcase cover 24, the rear crankcase 26, and the rear crankcase cover 27 through bearings. The output shaft 11 pierces through the front crankcase 25 without making contact with the front crankcase 25. Further, an output shaft driven gear 85 constantly meshed with the forward-operating driving gear 71 and the second intermediate gear 83 is fixed onto the output shaft 11. The output shaft driven gear 85 is driven for forward rotation or driven for reverse rotation through the gear that the dog clutch 73 is engaged with, whereby the output shaft 11 is rotated in a direction suitable for forward operating or backward operating of the vehicle. Such a control is made that the reverse-rotation driving is connected only when the counter shaft 9 is rotating at the first gear position.

The pairs of the first gear position driving gear 40 and the first gear position driven gear 60, the second gear position driving gear 41 and the second gear position driven gear 61, and the third gear position driving gear 42 and the third gear position driven gear 62 in the transmission described above are all, respectively, constantly meshed gears wherein the speed change ratios is effected by determining which of the oil hydraulic type multiple disk clutches 50, 65, and 66 is set into the connected condition. The control of the oil pressures for this is conducted by a valve body 120 assembled as an integral oil pressure control system by collecting solenoid valves and oil pressure changeover valves which are fitted to a front surface of the front crankcase cover 24 as shown in FIG. 2.

The valve body 120 is fitted to a fitting recessed portion 121 of the front crankcase cover 24 shown in FIG. 3, and is fixed to a fitting surface 122 in the surroundings through a gasket. In the fitted condition, a front half of the valve body 120 is exposed to the outside of the front crankcase cover 24, while a rear half is embedded in the fitting recessed portion 121 of the front crankcase cover 24. The fitting surface 122 of the front crankcase cover 24 is formed to be parallel to a partition surface of the crankcase.

Transfer of the working oil between the front crankcase cover 24 and the valve body 120 is performed between a plurality of working oil inlet/outlet ports provided in the fitting surface 122 and a plurality of working oil inlet/outlet ports provided in the fitting surface on the side of the valve body 120 at positions opposed to the former working oil inlet/outlet ports. The gasket intermediately disposed between the fitting surfaces of the valve body 120 and the front crankcase cover 24 is provided with oil passage holes at positions corresponding to the plurality of working oil inlet/outlet ports.

FIG. 3 shows concretely the working oil inlet/outlet ports provided in the valve body fitting surface 122 of the front crankcase cover 24. A working oil supply port 123 leads from the front crankcase cover 24 towards the valve body 120. A working oil inlet 124 leads from the valve body 120 towards the first gear position oil hydraulic type multiple disk clutch 50. A working oil inlet 125 leads from the valve body 120 towards the second gear position oil hydraulic type multiple disk clutch 65 and a working oil inlet 126 leads from the valve body 120 towards the third gear position oil hydraulic type multiple disk clutch 66.

In FIG. 3, an extension position 127 of a pump shaft centerline is illustrated for an oil pump, which is not shown. The oil pump is provided between the front crankcase cover 24 and the front crankcase 25. Oil supplied by the oil pump is fed to an oil filter 130 through oil passages 128 and 129 formed in the inside of a wall surface of the front crankcase cover 24. Then, after foreign matter is filtered away from the oil by the filter, a portion of the oil is fed out as a working oil for a torque converter, while the residual portion is fed out through an oil passage 131. A portion of the oil having passed through the oil passage 131 is supplied through the working oil supply port 123 into the valve body 120. The residual portion of the oil is supplied out through an oil passage 132 and an oil passage 133 extending orthogonally to the oil passage 132 towards the front crankcase 25, as a lubricating oil for bearing portions for the speed change gears and the like.

In addition, in FIG. 3, an extension position 8a of the centerline of the main shaft 8 of the transmission is illustrated. The working oil fed out to the working oil inlet 124 leading from the valve body 120 towards the first gear position oil hydraulic type multiple disk clutch 50 is fed into the front portion center hole 55 of the main shaft 8 through the working oil supply pipe 59 provided bridgingly from a rear surface of the front crankcase cover 24 to the front portion center hole 57, as shown in FIG. 6, and is supplied to the first gear position oil hydraulic type multiple disk clutch 50 through the working oil supply hole 57.

In FIG. 3, an extension position 9c of the centerline of the counter shaft 9 is illustrated. This portion of the front crankcase cover 24 is provided with an oil passage connection portion 134, and oil passages 135 and 136 are formed, which lead, respectively, from the working oil inlet 125 leading towards the second gear position oil hydraulic type multiple disk clutch 65 and the working oil inlet 126 leading toward the third gear position oil hydraulic type multiple disk clutch 66 to the oil passage connection portion 134. The working oil fed from the valve body 120 to the working oil inlet 125 or 126 is fed from the oil passage connection portion 134 to the front portion center hole 79 of the counter shaft 9 through either of the inner and outer passages of the working oil supply double-wall pipe 81 provided bridgingly to the front portion center hole 79, as shown in FIG. 6, and is supplied to the second gear position oil hydraulic type multiple disk clutch 65 or the third gear position oil hydraulic type multiple disk clutch 66.

As described above, in the present embodiment, the supply sources of the working oil and the lubricating oil for the automatic transmission are arranged concentratedly on the side of the front crankcase cover 24.

Figure 7:
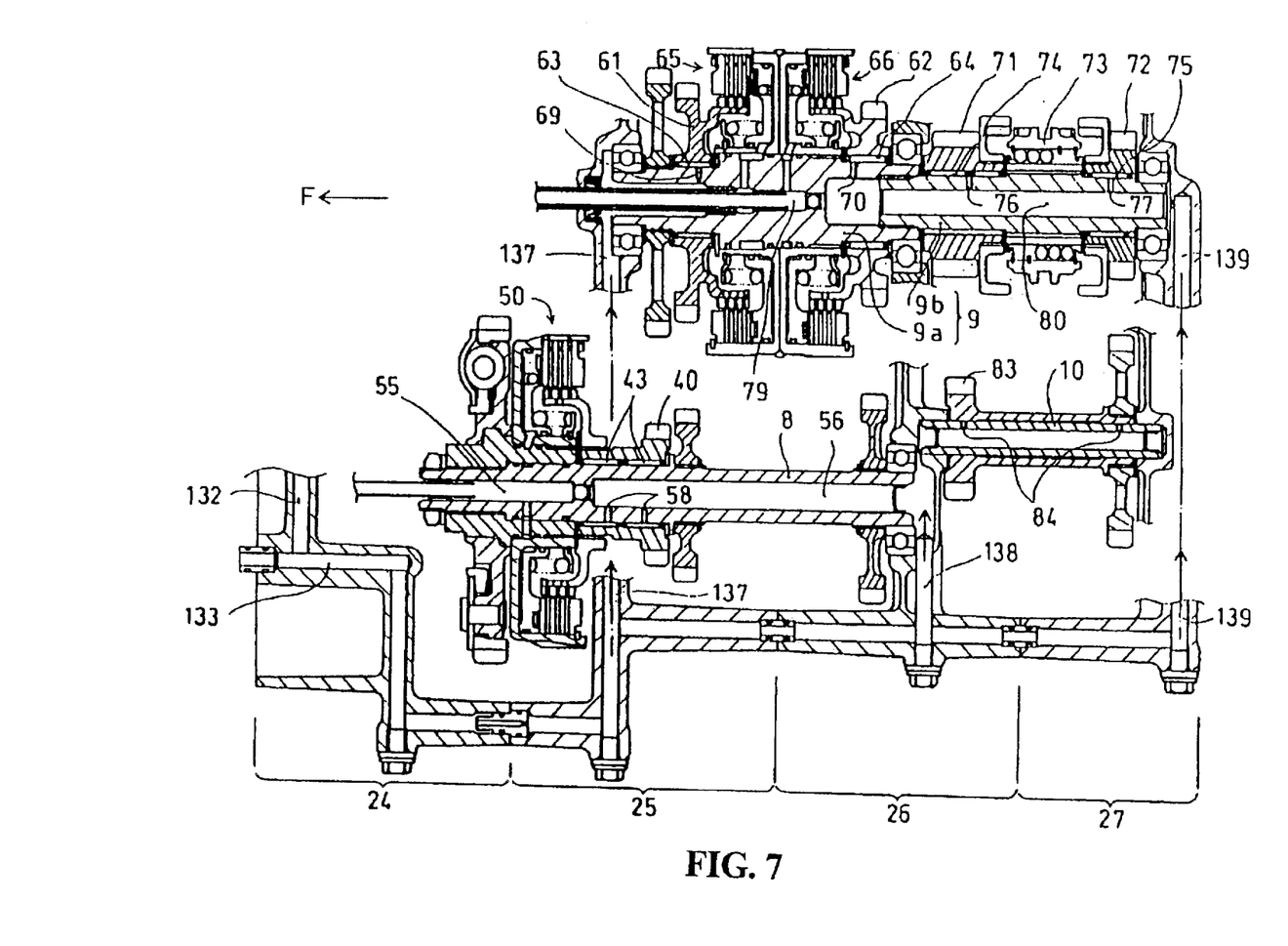
FIG. 7 is a vertical sectional view showing an oil passage for supplying a lubricating oil.

FIG. 7 is a vertical sectional view of an oil passage for supplying the lubricating oil, which follows to the oil passages 132 and 133 shown in FIG. 3. The lubricating oil supply passage has a structure in which oil holes bored in the surrounding portions of the front crankcase cover 24, the front crankcase 25, the rear crankcase 26, and the rear crankcase cover 27 are in communication with each other. As described above, the working oil for the clutches is all supplied directly from the front crankcase cover 24, while the lubricating oil for the bearing portions for the speed change gears is supplied through the oil passages in the front crankcase 25, the rear crankcase 26, and the rear crankcase cover 27.

An oil passage 137 bored in the front crankcase 25 is an oil passage for supplying the lubricating oil to the needle bearing 63 for the second gear position driven gear 61 on the counter shaft 9, through an oil passage between the front portion counter shaft 9a and the outer pipe 81a (FIG. 6) and through the lubricating oil supply hole 69. An oil passage 138 bored in the rear crankcase 26 is an oil passage for supplying the lubricating oil from the side of the rear portion center hole 56 to the needle bearing 43 for the first gear position driving gear 40 on the main shaft 8 through the lubricating oil supply hole 58, and for supplying the lubricating oil from the center hole of the intermediate shaft 10 to a sliding portion between the intermediate shaft 10 and the second intermediate gear 83 through the lubricating oil supply hole 84. An oil passage 139 bored in the rear crankcase cover 27 is an oil passage for supplying the lubricating oil from the center hole 80 of the rear portion counter shaft 9b to the needle bearing 64 for the third gear position driven gear 62 through the lubricating oil supply hole 70, to the needle bearing 74 for the forward-operating driving gear 71 through the lubricating oil supply hole 76, and to the needle bearing 75 for the backward-operating driving gear 72 through the lubricating oil supply hole 77.

Figure 8:
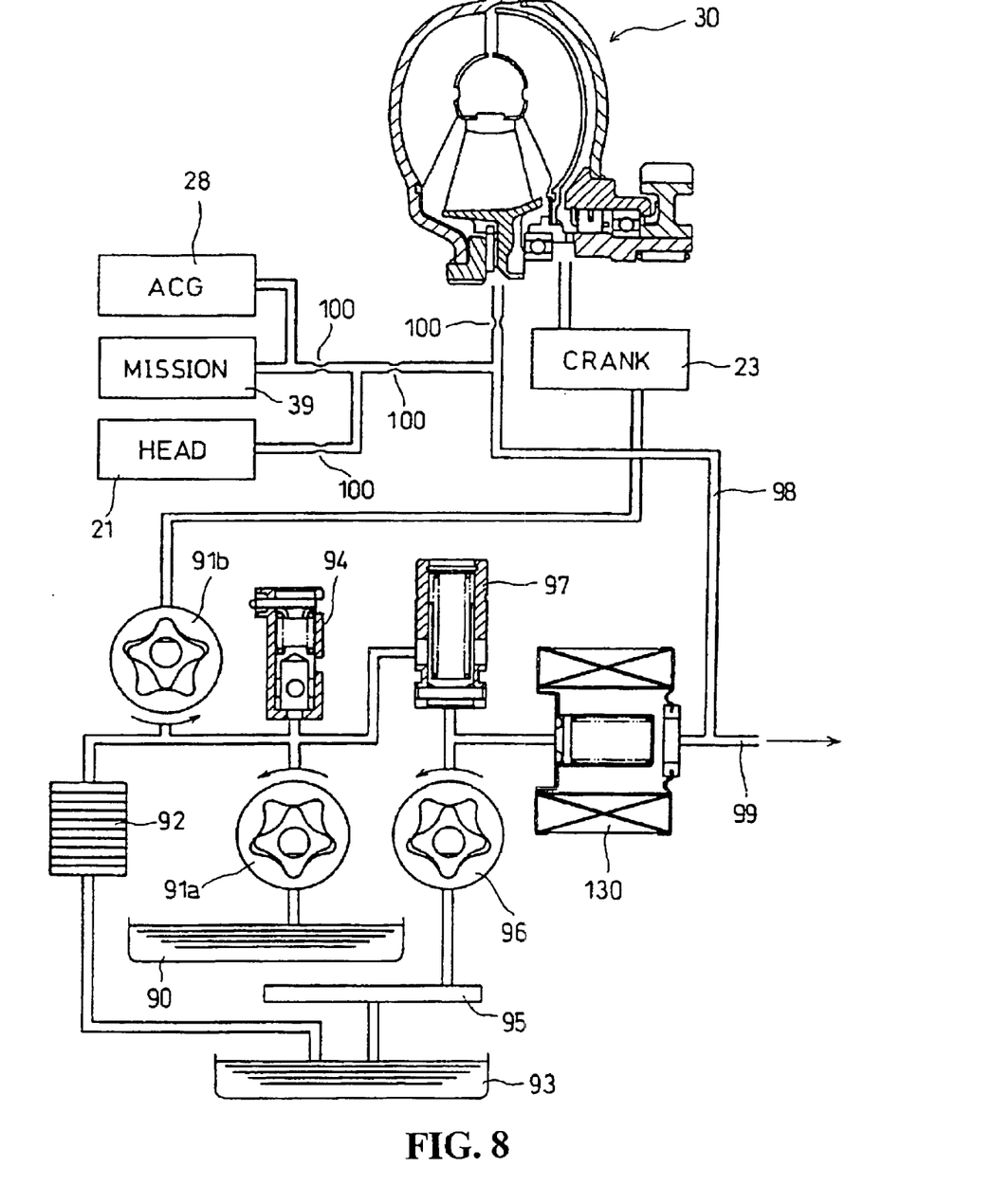
FIG. 8 is a system diagram of oil supply sources and the low-pressure working oil and the lubricating oil.
Figure 9:
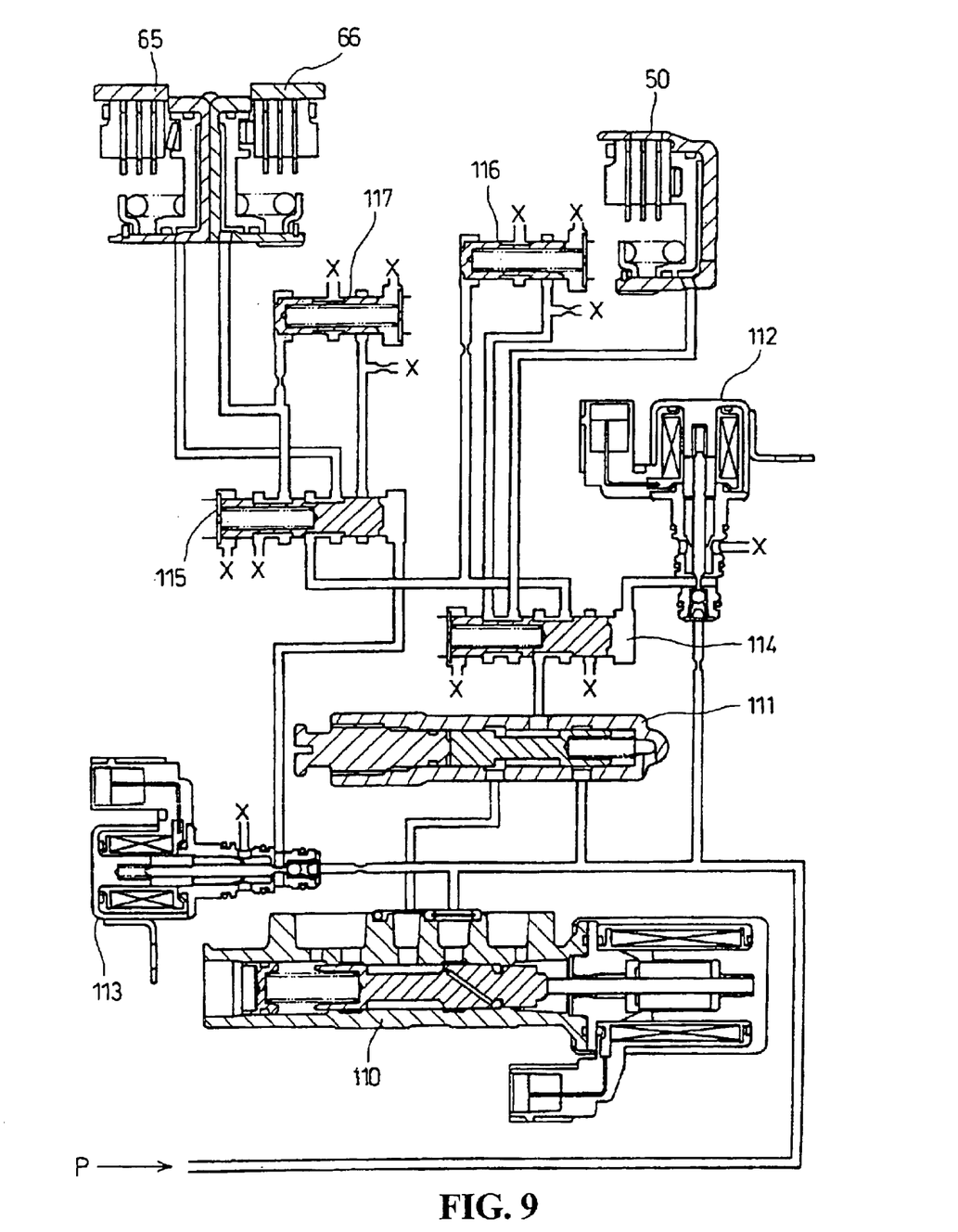
FIG. 9 is a system diagram showing an oil passage for the high-pressure working oil.

FIGS. 8 and 9 are system diagrams of the working oil and the lubricating oil in the present embodiment, in which FIG. 8 is a diagram showing an oil supply source and a low-pressure oil passage, and FIG. 9 is a diagram showing a high-pressure oil passage.

In FIG. 8, oil in an oil pan 90 at a bottom portion of the crankcase is sucked up by a scavenging pump 91a, and is once fed to an oil tank 93 through an oil cooler 92. An oil pressure relief valve 94 releases the oil into the crank chamber upon an abnormal rise of the pressure. The oil in the oil tank 93 is sucked by a feed pump 96 through an oil strainer 95, and is fed to individual portions as the working oil for the transmission and the torque converter and as the lubricating oil for the engine, through an oil filter 130. Here, a relief valve 97 is also provided, which releases the oil to a discharge port of the scavenging pump 91a upon an abnormal rise in the oil pressure at a discharge port of the feed pump 96.

An outlet oil passage of the oil filter 130 is branched into a low-pressure oil passage provided with orifices and an oil passage for supplying a high-pressure control oil to changeover valves of the transmission. Namely, an oil passage 98 drawn to extend upwards from an outlet of the oil filter 130 in FIG. 8 is the low-pressure oil passage, and the high-pressure oil passage 99 extends rightwards as indicated by an arrow to feed the oil to various valves shown in FIG. 9, thereby working the oil hydraulic type multiple disk clutches.

The oil fed into the low-pressure oil passage 98 is reduced in pressure appropriately by a plurality of orifices 100, is supplied for lubrication of individual portions such as the AC generator 28, the transmission 39, the cylinder head 21, and the like, and is used as the working oil for the torque converter 30. The working oil of which the pressure has been lowered at the torque converter 30 lubricates the crank system, and then accumulates at a lower portion of the crankcase 23. This oil is sucked up by a scavenging pump 91*b*, and returns to the oil tank 93 through the oil cooler 92.

FIG. 9 is a system diagram of working oil for operating the oil hydraulic type multiple disk clutches. In FIG. 9, equipment other than the oil hydraulic type multiple disk clutches 50, 65, and 66 is all assembled in the above-mentioned valve body 120. A portion of the oil, which is fed under pressure from the feed pump 96 of FIG. 8 provided in the crankcase 23 and driven by the internal combustion engine 4 is fed through the oil filter 130 is supplied at a high pressure from arrow P at a lower portion of FIG. 9 into this system, as the working oil for operating the oil hydraulic type multiple disk clutches. The portions denoted by X in FIG. 9 are discharge ports, and the used oil discharged from the discharge ports is recovered into the oil tank 93 shown in FIG. 8. The other portion of the oil having passed through the oil filter 130 is fed to individual portions as the working oil for the torque converter and as the lubricating oil for the transmission, valve cams, and the like as shown in FIG. 8.

In FIG. 9, the working oil is fed through a linear solenoid valve 110 and is further fed through changeover spool valves to be supplied to the clutches. The linear solenoid valve 110 is a valve for moderating the rise in the oil pressure at the time of starting the supply of the working oil. The working oil having passed through the linear solenoid valve 110 is fed to the changeover spool valve through an emergency valve 111. The emergency valve 111 plays the role of simply providing an oil passage for the working oil in normal condition, but upon a failure of the linear solenoid valve 110, provides a new path for distributing the working oil by bypassing the linear solenoid valve 110. The emergency valve 111 is manually operated upon the failure of the linear solenoid valve.

A first-second gear position changeover solenoid valve 112 and a second-third gear position changeover solenoid valve 113 are for controlling the ON/OFF of oil pressures for driving spools of a first-second gear position changeover spool valve 114 and a second-third gear position changeover spool valve 115, respectively, and the supply destinations of the working oil from the spool valves 114 and 115 are determined by the positions of the spools. When the working oil is supplied to either one of the oil hydraulic type multiple disk clutches 50, 65, or 66, the clutch is set into a connected condition, whereby the floating gear connected to the clutch is fixed to a shaft, and speed change is performed at a speed reduction ratio determined by the gear. At this time, it is necessary to discharge the working oil from the oil hydraulic type multiple disk clutch, which has been in the connected condition before that speed change. The discharged oil is discharged through an oil pressure control valve 116 or 117, which is controlled in oil pressure and in which an appropriate oil passage is formed.

In the present embodiment, the oil filter 130 and the control system of the transmission are fitted to the crankcase cover 24, and the high-pressure oil passage is provided concentratedly in the crankcase cover 24, so that the steps of dust removal and pressure resistance test at the time of production can be concentrated to one component part. In addition, the lubricating line for the torque converter is used in common with other lubricating lines, and the lines are branched from a single feed circuit, so that the filter systems are integrated.

Therefore, replacement and repair of the oil filter 130 and the high-pressure oil passage can be performed in the condition where they are mounted on the vehicle, by simply detaching the crankcase cover 24. In addition, since connection parts of the crankcase cover 24 inclusive of the oil filter 130 can be preliminarily assembled, the number of operating steps in a main line can be reduced, whereby productivity is enhanced. Besides, a leakage test of the high-pressure portions and the like can be performed before assembling the crankcase cover 24 so that operability is improved.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An internal combustion engine with a torque converter, comprising:

a single feed pump for supplying both a working oil for a torque converter and a lubricating oil for said engine;

an oil filter in communication with a discharge port of said feed pump is fitted to a crankcase cover;

an outlet oil passage of said oil filter is branched into a low-pressure oil passage provided with an orifice and an oil passage for supplying a high-pressure control oil to changeover valves of a transmission, and said high-pressure oil passage is provided concentratedly in said crankcase cover; and an oil control unit is fitted to the crankcase cover.

2. The internal combustion engine with a torque converter according to claim 1, wherein said single feed pump supplies working oil directly to said oil filter for filtration prior to communicating said oil to said outlet oil passage and said oil filter being removably mounted relative to said crankcase cover for periodic replacement.

3. The internal combustion engine with a torque converter according to claim 2, wherein the discharge port of said single feed pump is in direct communication with said oil filter for supplying oil to said oil filter.

4. The internal combustion engine with a torque converter according to claim 1, wherein said outlet passage directly supplies oil from said oil filter as working oil for said transmission and as lubricating oil supplied through said orifice to said engine.

5. The internal combustion engine with a torque converter according to claim 1, wherein said low-pressure passage is branched into a plurality of passages and an orifice is provided in each of said branches of said low-pressure passage for supplying lubricating oil to selective portions of said engine.

6. The internal combustion engine with a torque converter according to claim 1, wherein said outlet oil passage of said oil filter is mounted for being readily replaced during servicing after said crankcase cover is removed.

7. The internal combustion engine with a torque converter according to claim 6, wherein a leakage test is readily performed by preliminarily assembling said outlet oil passage and said oil filter relative to said oil pump with said crankcase cover removed prior to final assembly.

8. An oil supply adapted to be used with an internal combustion engine with a torque converter, comprising:
- a feed pump for supplying both a working oil for a torque converter and a lubricating oil for an engine;
- an oil filter in communication with a discharge port of said feed pump is fitted to a crankcase cover;
- an outlet oil passage of said oil filter is branched into a low-pressure oil passage provided with an orifice and an oil passage for supplying a high-pressure control oil to changeover valves of a transmission, and said high-pressure oil passage is provided concentratedly in said crankcase cover; and
- an oil control unit fitted to the crankcase cover.

9. The oil supply according to claim 8, wherein said single feed pump supplies working oil directly to said oil filter for filtration prior to communicating said oil to said outlet oil passage and said oil filter being removably mounted relative to said crankcase cover for periodic replacement.

10. The oil supply according to claim 9, wherein the discharge port of said single feed pump is in direct communication with said oil filter for supplying oil to said oil filter.

11. The oil supply according to claim 8, wherein said outlet passage directly supplies oil from said oil filter as working oil for said transmission and as lubricating oil supplied through said orifice to said engine.

12. The oil supply according to claim 8, wherein said low-pressure passage is branched into a plurality of passages and an orifice is provided in each of said branches of said low-pressure passage for supplying lubricating oil to selective portions of said engine.

13. The oil supply according to claim 8, wherein said outlet oil passage of said oil filter is mounted for being readily replaced during servicing after said crankcase cover is removed.

14. The oil supply according to claim 13, wherein a leakage test is readily performed by preliminarily assembling said outlet oil passage and said oil filter relative to said oil pump with said crankcase cover removed prior to final assembly.

15. The internal combustion engine with a torque converter according to claim 1, wherein said oil control unit is assembled as an integral unit by solenoid valves.

16. The internal combustion engine with a torque converter according to claim 1, wherein said oil control unit is assembled as an integral unit by solenoid valves and oil pressure changer valves.

17. The internal combustion engine with a torque converter according to claim 1, wherein said oil control unit is assembled as an integral unit by oil pressure changer valves.

18. An oil supply adapted to be used with an internal combustion engine with a torque converter, comprising:
- a feed pump for supplying both a working oil for a torque converter and a lubricating oil for an engine;
- an oil filter in communication with a discharge port of said feed pump is fitted to a crankcase cover; and
- an outlet oil passage of said oil filter is branched into a low-pressure oil passage provided with an orifice and an oil passage for supplying a high-pressure control oil to changeover valves of a transmission and said outlet oil passage of said oil filter is mounted for being readily replaced during servicing after said crankcase cover is removed and said high-pressure oil passage is provided concentratedly in said crankcase cover;
- wherein a leakage test is readily performed by preliminarily assembling said outlet oil passage and said oil filter relative to said oil pump with said crankcase cover removed prior to final assembly.

19. The oil supply according to claim 18, wherein said single feed pump supplies working oil directly to said oil filter for filtration prior to communicating said oil to said outlet oil passage and said oil filter being removably mounted relative to said crankcase cover for periodic replacement.

20. The oil supply according to claim 19, wherein the discharge port of said single feed pump is in direct communication with said oil filter for supplying oil to said oil filter.

* * * * *